Patented Oct. 31, 1950

2,527,590

UNITED STATES PATENT OFFICE 2,527,590

INTERACTION OF HYDROXYMETHYL SILOXANES WITH HYDROCARBON DI-ISOCYANATE

John Leopold Speier, Jr., Pittsburgh, Pa., assignor to Dow Corning Corporation, Midland, Mich., a corporation of Michigan No Drawing. Application July 2, 1948, Serial No. 36,812. In Great Britain August 26, 1947

4 Claims. (Cl. 260—46.5)

The present invention relates to the production of organosilicon resins and to the resins so produced.

Organosilicon resins, such as are presently available commercially, are polymeric organosiloxanes. These siloxane resins now available represent a very substantial advance in the resin art inasmuch as they are of much greater thermal stability than the organic resins previously available.

Objects of the present invention are the provision of improved thermally stable resins which are hard, tough and resistant to solvents; the provision of resins of the character indicated which are of utility as coating compositions; and the provision of resins of the character indicated which are of utility as electrically insulating resins particularly in which to imbed electrical equipment, i. e. potting compounds.

In accordance with the present invention, polyhydric alcohols which contain at least 2 hydroxymethyl radicals bonded to one or more silicon atoms in the alcohol and in which the remaining valences of the silicon atoms are satisfied either with oxygen of siloxane bonds or with hydrocarbon radicals are reacted with hydrocarbonyl di-isocyanate. Resinous reaction products are obtained by the interaction of these two types of polyfunctional materials.

The hydrocarbonyl di-isocyanates employed in the process of the present invention are at present commercially available materials. Two of these materials at present available on the open market are toluene di-isocyanate and hexamethylene di-isocyanate. These materials are sold in a technical grade in mixture with ortho dichlorobenzene.

The dibasic alcohol which is employed in the method hereof is a type of material not heretofore known or described. The production of this material is described in four copending specifications filed simultaneously herewith. The methods there described or any other appropriate methods may be employed in the preparation of these polybasic alcohols. Alcohols of the following types have been prepared and are of utility in the present method:

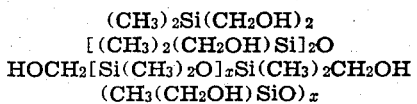

Other hydrocarbon radicals, such as higher alkyl or phenyl radicals may be substituted for the methyl radicals if desired.

The method disclosed in my copending applications for the preparation of these materials involves the preparation of polycarboxymethyl silanes by the esterification of chloromethyl silicon compounds. These carboxymethyl compounds are then subjected to alcoholysis by methods known in the art for the alcoholysis of organic esters. The products of the alcoholysis are the desired polybasic alcohols.

Chlorides suitable as starting materials include compounds of the type $R_nSi(CH_2Cl)_{4-n}$ wherein R represents hydrocarbonyl radicals and $n$ represents either 1 or 2.

The poly-chloromethyl substituted siloxanes may be obtained by any suitable or appropriate means. Thus, they may be produced by the chlorination of trimethyl silicon chloride to produce chloromethyl dimethyl siliconchloride. This may be hydrolyzed and condensed to yield symmetrical bis-chloromethyl tetramethyl disiloxane. It may likewise be co-hydrolyzed and co-condensed with dimethyl silicon dichloride to produce linear dimethyl siloxanes end-blocked with chloromethyl dimethyl silyl groups. The chloromethyl dimethyl silicon chloride may likewise be co-hydrolyzed and co-condensed with chloromethyl methyl silicon dichloride, produced by direct chlorination of dimethyl silicon dichloride. Upon co-condensation, linear chloromethyl methyl siloxanes are obtained which are end-blocked with chloromethyl dimethyl silyl groups. The chloromethyl dimethyl silicon chloride may be co-hydrolyzed and co-condensed with trimethyl silicon chloride. When these two materials are in equivalent amounts there is obtained a 50 mol per cent yield of chloromethyl pentamethyl disiloxane and a 25 mol per cent yield of symmetrical bis-chloromethyl tetramethyl disiloxane.

In the direct chlorination processes above described, good yields of product containing chloromethyl radicals are obtainable. If other than methyl radicals are contained in the silanes chlorinated, the separation of relatively pure materials from the chlorination products is somewhat complicated due to the chlorination of other than methyl radicals. Accordingly, when it is desired to produce siloxanes which contain other than methyl radicals, it is desirable to effect the chlorination of a methyl silicon chloride free of other organic radicals. The product of this chlorination may then be subjected to reaction with a Grignard reagent, to introduce into the silane any desired organic radicals. Thus, the remaining radicals in the siloxane may be alkyl radicals, either lower alkyl, such as methyl, ethyl or higher alkyls such as octadecyl, or they may be aryl radicals, such as phenyl.

Chloromethyl methyl silicon dichloride, produced as above indicated, may be co-hydrolyzed and co-condensed with trimethyl silicon chloride to produce linear chloromethyl methyl siloxanes end-blocked with trimethyl silyl groups.

Cyclic poly-chloromethyl siloxanes in which the remainder of the radicals linked to the silicon atoms are hydrocarbonyl radicals may be obtained from compounds of the type $$ClCH_2RSiCl_2$$

by hydrolysis and condensation.

The esters are prepared from chloromethyl silicon compounds of the types indicated by reacting these compositions with a metal salt of a carboxylic acid in the presence of this salt. Preferably, the carboxylic acid in the free state is employed as solvent. The best results are obtained in the formation of the ester when a completely condensed hydrocarbonyl chloromethyl siloxane is employed. In order to obtain adequate reaction rates, it is desirable to heat the reaction mixture to above 100° C. Pressure is not essential in the esterification. Only such pressure is employed as may be desirable to prevent loss of reactants.

This method and the esters so prepared are fully disclosed and claimed in my copending application, Serial Number 36,813, filed simultaneously herewith.

The esters so produced are subjected to alcoholysis in accordance with known methods for the alcoholysis of esters. Virtually any alcohol desired may be employed. Acidic and basic catalysts promote the reaction. It is desirable likewise to employ an excess of the alcohol to acid in carrying the reaction to completion. The polyhydroxymethyl silicon compound so produced may if desired be separated from unreacted material and by-products.

As above indicated in accordance with the present invention the alcohol so produced is reacted with a hydrocarbonyl di-isocyanate. Reaction is obtained both in the pure state of the materials and also with the reactants diluted with solvents such as chlorobenzenes. If desired, toluene may be employed as a solvent. It is noted in this connection that the reactants are soluble in the toluene whereas the resins produced by the reaction are only slightly soluble in toluene.

The relative proportions of the two reactants may be varied considerably, though it is preferred to interact the two in amount such that the number of hydroxymethyl radicals is equal to the number of isocyanate radicals.

In order to effect the interaction, all that is necessary is to mix the two reactants. The reaction involved is exothermic. Since the alcoholic reactant is not thermally stable it is preferable to maintain the temperature of the reaction mixture at less than 100° C. during the course of the reaction. The reaction product however, is stable and accordingly any reaction product which has been formed is not decomposed or degenerated in any case in which the temperature does exceed 100° C.

The specific physical properties of the products of the reaction differ to some extent depending upon the particular di-isocyanate which is employed. Thus, with the aromatic di-isocyanates such as toluene di-isocyanate soluble resins are produced. These resins are soluble in the highly polar solvents such as the glycol and polyglycol type in which one of the hydroxyl hydrogens is substituted with a hydrocarbonyl radical and the ketones such as methyl ethyl ketone and methyl butyl ketone. These resins occur both as soluble solids and as soluble resinous fluids, both of which are very thermally stable. The solid type of resin is of utility both as a panel coating material and as a wire coating material for application either directly to magnet wire or to glass-served magnet wire.

EXAMPLES

*Example 1*

One equivalent of symmetrical bis-hydroxymethyltetramethyldisiloxane was added to one equivalent of toluene 2,4-di-isocyanate, the latter being as a 75% solution in dichlorobenzene. The two interacted readily with the evolution of heat. The viscosity increased until the mixture became a tacky semi-solid which was soluble in acetone and in alcohol but insoluble in toluene. It was employed as a coating for paper, wood and metal. Upon heating the coated materials briefly at 100° C. a tough lacquor-like film was produced which was insoluble in alcohol.

*Example 2*

Hexamethylenedi-isocyanate in 50% solution was substituted for the di-isocyanate employed in Example 1. In this case the interaction was slower, so the mixture was maintained for 24 hours. A viscous resin was formed which had become insoluble in alcohol and acetone at the end of the time. This gel was heated at 150° C. to drive off the dichlorobenzene which had been employed as a solvent. A soft elastic polymer remained. This polymer could be swelled by acetone and by alcohol.

*Example 3*

Symmetrical bis-acetoxymethyltetramethyldisiloxane was dissolved in a large excess of methanol over that necessary for methanolysis and was mixed with hexamethylcyclotrisiloxane and enough HCl to make the mixture acidic. The mixture was prepared in proportions to give the average compositions $$HOCH_2(CH_3)_2SiO[Si(CH_3)_2O]_3Si(CH_3)_2CH_2OH$$

The methyl acetate formed was removed over a two week period by distillation.

This dialcohol was reacted with the toluene and the hexamethylene di-isocyanates in accordance with the methods outlined in Examples 1 and 2. With the toluene 2,4-di-isocyanate a very viscous liquid polymer was produced which was soluble in acetone and in alcohol but not in toluene. Films were formed on iron, copper, magnesium, aluminum and glass by coating articles thereof with acetone solutions of the polymer. Tough insoluble films were produced by heating at 150° C. These films were flexible even after heating at 200° C. for 124 hours. The films are flexible and adherent at 200° C.

Resinous liquids were likewise obtained from the reaction with hexamethylene di-isocyanate.

*Example 4*

Dichloro(chloromethyl)methylsilane was reacted with phenylmagnesium bromide by mixing two mols of the silane and 2.8 mols of the phenyl Grignard reagent. The product was distilled and the following materials were obtained thereby:

(1) Chloro(chloromethyl)methylphenylsilane having a boiling point of 136° C. at 24 mm.

(2) (Chloromethyl)methyldiphenylsilane which had a boiling point of 198° C. at 23 mm., an index of refraction at 25° C. of 1.5785 and a density at 25° C. of 1.101.

The chloro(chloromethyl)methylphenylsilane was hydrolyzed and the hydrolyzate distilled. There was thereby obtained symmetrical di(chloromethyl)dimethyldiphenyldisiloxane,

[C6H5CH3(CH2Cl)Si]2O

This compound was found to boil at 237° C. at 24 mm., to have an index of refraction at 25° C. of 1.5466 and a density of 25° C. of 1.161.

The disiloxane so produced was refluxed with a glacial acetic acid solution of potassium acetate, a slight excess of the potassium acetate being employed. After 18 hours of refluxing the mixture was washed with water and the product was distilled, whereby there was obtained symmetrical bis(acetoxymethyl)dimethyldiphenyldisiloxane. This compound had a boiling point of 210° to 220° C. at 1.4 mm., an index of refraction at 25° C. of 1.5118 and a density at 25° C. of 1.092.

40.2 grams of the disiloxane so produced were mixed with 36.7 grams of methylsteryldichlorosilane and 21.2 grams of phenylmethyldichlorosilane. This mixture was dissolved in ethanol. Reaction occurred which resulted in the hydrolysis of the silicon bonded chlorine, in interaction to produce a polysiloxane and in the alcoholysis of the acetoxymethyl substituents to give hydroxymethyl substituents. The product so produced is a polysiloxane of the average composition (HOCH2C6H5CH3SiO0.5)2(C18H37CH3SiO)(C6H5CH3SiO)1.1

This product is a viscous yellow fluid.

10 grams of this fluid were mixed with 2.3 grams of toluene-3,5-di-isocyanate which was readily soluble in the siloxane and yielded a sparkling clear solution which grew warm and increased in viscosity until it became very thick. This product is a stable resinous liquid.

*Example 5*

The symmetrical bis-acetoxymethyl)dimethyldiphenyldisiloxane described in Example 4, in amount of 20.1 grams, was mixed with 11.1 grams of hexamethylcyclotrisiloxane, 177 cubic centimeters of methanol and 3 drops of concentrated aqueous hydrochloric acid. This resulted in the formation of a siloxane polymer and in the methanolysis of the acetoxymethyl substituents to produce hydroxymethl substituents. The average formula of the product so produced is as follows:

HOCH2CH3C6H5Si[OSi(CH3)2]3
OSiCH3C6H5CH2OH.

This product was recovered from the reaction mixture by removing the volatile materials by passing a stream of dry air through the product at 125 mm. pressure. This product is a slightly colored odorless liquid.

This product, in the amount of 10 grams, was mixed with 3.4 grams of toluene-3,5-di-isocyanate. The mixture was stirred and became a light amber colored homogeneous solution of about 200 centistokes viscosity. The viscosity continued to increase during the course of the reaction. When the reaction rate slowed down as evidenced by the reaction mixture cooling, the mixture was heated to 135° C. for 15 minutes. A viscous liquid was thereby obtained. This polymer was applied to a metal panel as a coating. The panel so coated was polymerized by exposure to air for 3 days. There was thereby obtained a tough flexible coating. Heating of the panel for 2 days at 150° C. did not effect the properties of the coated panel.

That which is claimed is:

1. The method which comprises interacting a hydrocarbon di-isocyanate with bis-hydroxymethyltetramethyldisiloxane.

2. The method which comprises interacting a hydrocarbon di-isocyanate with a siloxane of the general formula HOCH2(R2SiO)nSiR2CH2OH in which R represents hydrocarbon radicals free of aliphatic unsaturation and $n$ has a positive value.

3. The method in accordance with claim 2 in which R represents both alkyl and aryl radicals.

4. The method of producing organosilicon polymers which comprises interacting a hydrocarbon di-isocyanate with a polysiloxane polyhydric alcohol in which polysiloxane all the silicon atoms are linked together by siloxane bonds, which polysiloxane contains, bonded to silicon atoms, monovalent hydrocarbon radicals, free of aliphatic unsaturation, and a plurality of hydroxymethyl radicals, all of the bonds of said silicon atoms being satisfied by said siloxane bonds, said hydroxymethyl radicals and said hydrocarbon radicals.

JOHN LEOPOLD SPEIER, JR.

REFERENCES CITED

The following references are of record in the file of this patent:

UNITED STATES PATENTS

| Number | Name | Date |
| --- | --- | --- |
| 2,284,637 | Catlin | June 2, 1942 |

OTHER REFERENCES

Speier et al., Jour. Amer.-Chem. So., vol. 70, 1948, pp. 117 and 118.